(12) United States Patent
Ruediger

(10) Patent No.: US 8,836,526 B2
(45) Date of Patent: Sep. 16, 2014

(54) MONITORING DEVICE FOR DE-ENERGIZED CATENARY SYSTEMS OR OVERHEAD LINES

(76) Inventor: Harald Ruediger, Dresden (DE)

( * ) Notice: Subject to any disclaimer, the term of this patent is extended or adjusted under 35 U.S.C. 154(b) by 101 days.

(21) Appl. No.: 13/519,469

(22) PCT Filed: Jul. 9, 2010

(86) PCT No.: PCT/EP2010/059927
§ 371 (c)(1),
(2), (4) Date: Jun. 27, 2012

(87) PCT Pub. No.: WO2011/079968
PCT Pub. Date: Jul. 7, 2011

(65) Prior Publication Data
US 2012/0286963 A1  Nov. 15, 2012

(30) Foreign Application Priority Data
Dec. 29, 2009 (DE) .......... 10 2009 060 830

(51) Int. Cl.
*G08B 21/00* (2006.01)
*B60M 1/02* (2006.01)
*G08B 13/14* (2006.01)
*H02G 1/02* (2006.01)

(52) U.S. Cl.
CPC ............. *B60M 1/02* (2013.01); *G08B 13/1454* (2013.01); *G08B 13/1445* (2013.01); *B60M 2200/02* (2013.01); *H02G 1/02* (2013.01)
USPC ........................................ 340/664; 340/568.1

(58) Field of Classification Search
CPC ........... G08B 13/1445; G08B 13/1454; G08B 25/018; G01R 19/16571
USPC .............................. 340/664, 568.1, 568.2, 571
See application file for complete search history.

(56) References Cited

U.S. PATENT DOCUMENTS 6,686,841 B1 * 2/2004 Busch et al. .................. 340/571

FOREIGN PATENT DOCUMENTS

| CN | 2071396 U | 2/1991 |
|---|---|---|
| DE | 9101296 U1 | 5/1991 |
| FR | 2178727 A1 | 11/1973 |

OTHER PUBLICATIONS

International Search Report for PCT/EP2010/059927 dated Nov. 16, 2011.

* cited by examiner

*Primary Examiner* — John A Tweel, Jr.
(74) *Attorney, Agent, or Firm* — Heslin Rothenberg Farley & Mesiti P.C.

(57) ABSTRACT

A monitoring device for de-energized catenary systems having bearer cables, contact wires, droppers, grounding lines, overhead lines and cable systems, during new construction or servicing work, to counter theft, is easy to implement, can be installed quickly and enables monitoring of predetermined track sections. Catenaries or overhead lines or cable systems are divided into segments, each consisting of two parallel strands, by forming a line resistance at one end by short-circuiting the strands of each segment, by connection each of the free ends of the segments with a respective measuring resistor of a predetermined size and a respective voltage source to form a respective closed circuit, and by each circuit being connected to a measuring unit for measuring loop current. The measuring unit is equipped with a monitoring device for triggering an alarm device when a predetermined limit value is exceeded or the loop current is interrupted.

7 Claims, 2 Drawing Sheets

MONITORING DEVICE FOR DE-ENERGIZED CATENARY SYSTEMS OR OVERHEAD LINES

CROSS REFERENCE TO RELATED APPLICATIONS

This application is a national stage filing under section 371 of International Application No. PCT/EP2010/059927 filed on Jul. 9, 2010, and published in German on Jul. 7, 2011 as WO 2011/079968 A2 and claims priority of German application No. 10 2009 060 830.3 filed on Dec. 29, 2009, the entire disclosure of these applications being hereby incorporated herein by reference.

BACKGROUND ART

The invention relates to a monitoring device for zero-voltage-switched contact line installations, grounding lines, overhead lines and cable installations during new-build or service anti-theft measures.

In particular new-build measures of electrified railroad sections or subsequent electrification thereof require considerable construction and installation complexity which can extend over several months in the case of relatively long sections. Since the construction site always moves along with the progress of the building measure further from the starting point of the building measure, naturally only the direct construction site region can be monitored and protected from the theft of valuable construction materials.

For contact line installations comprising supporting cables, contact wires, tension cables, underground cables and grounding lines for potential and protective measures or else for overhead lines and cable installations for power transmission, use is made of high-value materials. In particular, non-ferrous metals are used, or the materials used contain nonferrous metals and there is therefore the temptation to steal such materials owing to the considerable scrap value.

The risk of theft is especially high in particular in the case of new-build sections in sparsely populated areas or in areas with a relatively low standard of living. Owing to the losses and additional expenditures associated with a theft, there is particular interest in also being able to establish remotely whether an attempted theft is taking place at a certain time and, if so, if possible also the location of this theft in order to be able to send out security personnel or the police or the border police or the like in targeted fashion and to check the attempted theft as early as possible and therefore to contain the damage caused as far as possible.

Until now, the only monitoring option has consisted in sporadic or regular checks on the new-build section until it is brought into commission. From this time on, i.e. when the rated voltage is applied to the entire section, the possibility of theft is virtually ruled out since line interruptions and ground faults are continuously monitored by the contact line management system. This takes place by continuous line measurement and alarm triggering when line interruptions or ground faults are established.

In the case of new-build sections of contact line installations or overhead line sections which are subject to zero voltage switching, such a possibility does not exist, however.

Yet even in the case of contact line installations which have the rated voltage applied to them, the underground cable belonging to the contact wire can be partially or entirely stolen without being noticed.

Therefore, the invention is based on the object of providing a monitoring device which can be realized as simply as possible for zero-voltage-switched contact line installations or overhead lines during new-build or service anti-theft measures, which monitoring device can also be installed quickly and enables monitoring of predetermined line sections.

BRIEF SUMMARY OF INVENTION

The object addressed by the invention is achieved in the case of a monitoring device for zero-voltage-switched contact line installations comprising supporting cables, contact wires and hangers as well as grounding lines, overhead lines and cable installations in that contact lines or overhead lines or cable installations are divided into segments of in each case two parallel strands, and a line resistance is formed by short-circuiting the strands of each segment at one end, in that the free ends of the segments are connected to in each case one measuring resistor of a predetermined size and in each case one voltage source to form a respective closed circuit, and in that each circuit is connected to a measuring apparatus for measuring the loop current, which measuring apparatus is equipped with a monitoring device for triggering an alarm of an alarm device in the event that a predetermined limit value is exceeded or the loop current is interrupted.

The contact lines or overhead lines or cable installations are preferably divided into segments of equal length.

Contact line installations are grouped into segments comprising contact wire sections and associated supporting cable sections and associated hangers, the segments preferably being approximately 2-8 km long.

In addition, each circuit formed by a segment is connected to a stabilized voltage source of equal size, which source preferably produces a DC voltage of 5 V.

In a further configuration of the invention, the circuits ($SK_1$-$SK_n$) with the respectively associated measuring apparatuses (MV) are connected to a multiplexer (MP), which for its part is coupled to a central computer (CPU) with an evaluation unit (AE), wherein a clock generator (TG) is associated with the multiplexer (MP) for clocked connection of the measuring apparatuses (MV) to the central computer (CPU).

Furthermore, the circuits are connected to the measuring apparatus directly or via the multiplexer via a radio link.

If the contact line installation in the monitored section, i.e. the contact wire and the supporting cable, is severed, the current flow is interrupted at the same time and an alarm is triggered.

If the contact line resistance is also monitored, in the event of a change in the resistance when a predetermined minimum section of the contact wire is cut away, an alarm is triggered when only one contact wire section is severed.

For the alarm triggering, a radio transmission from the monitoring device to a monitoring control center can preferably be used.

The monitoring device according to the invention can be installed particularly simply and quickly and ensures rapid and safe identification of an attempted theft.

In order to precisely narrow down the location of the theft, there is also the possibility, in addition, of a pulse or pulse train being emitted by the monitoring device once the alarm has been triggered and of the propagation time before arrival of an echo from the interruption point being measured. The distance from the measurement point can be calculated easily from the propagation time of the pulse. This is advantageous when, for example, the contact wire and the supporting cable have been completely severed.

This has the particular advantage that access can be prepared very precisely and implemented successfully.

The way in which the loop current measurement according to the invention functions will be explained in more detail below with reference to an exemplary embodiment.

BRIEF DESCRIPTION OF DRAWING FIGURES

In the associated drawings.

DETAILED DESCRIPTION

It goes without saying that the monitoring device described below using an example of a contact line installation can equally be used correspondingly for monitoring overhead lines and cable installations or else for the warehousing of contact lines, overhead lines, underground cables which are not yet in regular operation.

Figure 1:
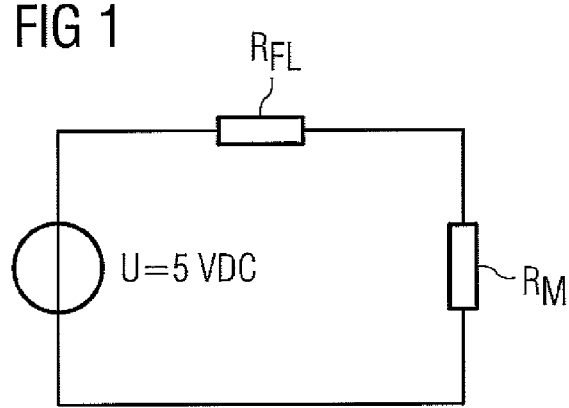
FIG. 1 shows an equivalent circuit diagram illustrating the mode of operation of the loop current measurement.

FIG. 1 shows an equivalent circuit diagram with a contact line resistance $R_{FL}$, a measuring resistor $R_M$ and a voltage source VDC (U=5 V), which preferably provides a stabilized voltage.

Using the switching principle explained in more detail below, it is possible to safely identify any stealing of parts of contact line installations and for an alarm to be triggered. It is of course also possible for any damage caused by severe weather or the like to be detected.

In order to achieve this, two contact wires or one contact wire with an associated supporting cable of a contact line installation are divided into segments $S_1$-$S_n$ of equal length, which have a length of in each case 2-8 km, for example. Then, the segments are connected to one another at one end so as to form the contact line resistance $R_{FL}$ and are completed with a measuring resistor $R_M$ and a voltage source VDC to form a loop circuit $SK_1$-$SK_n$ as shown in FIG. 3.

Figure 2:
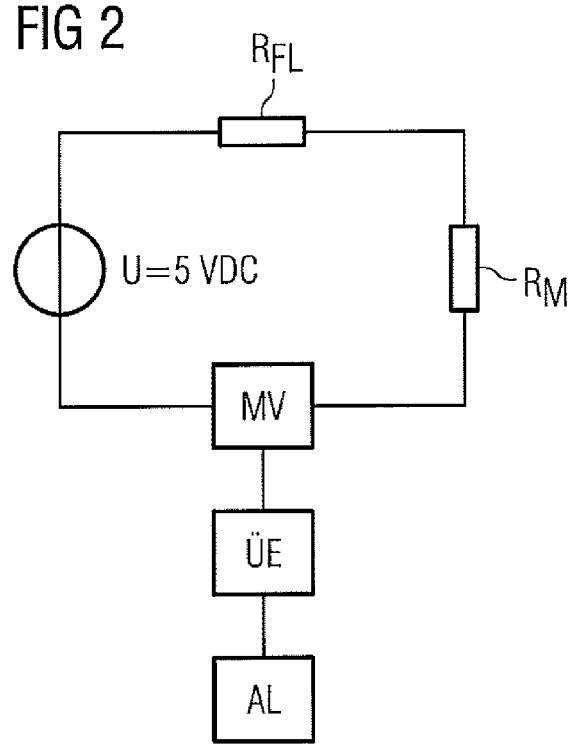
FIG. 2 shows a schematic block circuit diagram of a complete monitoring device.

FIG. 2 shows a schematic block circuit diagram of a complete monitoring device, in which a measuring apparatus is associated with the loop circuit $SK_1$-$SK_n$, said measuring apparatus being connected to a monitoring unit ÜE and an alarm device AL.

It is now possible for the apparatus shown in FIG. 2 without the alarm device to be brought into position on the segments $S_1$-$S_n$ and for a radio signal to be transmitted to a central alarm device AL when setpoint values are exceeded, or else the measurement signals are transmitted from the measuring apparatus MV via radio to a central monitoring device ÜE.

Figure 3:
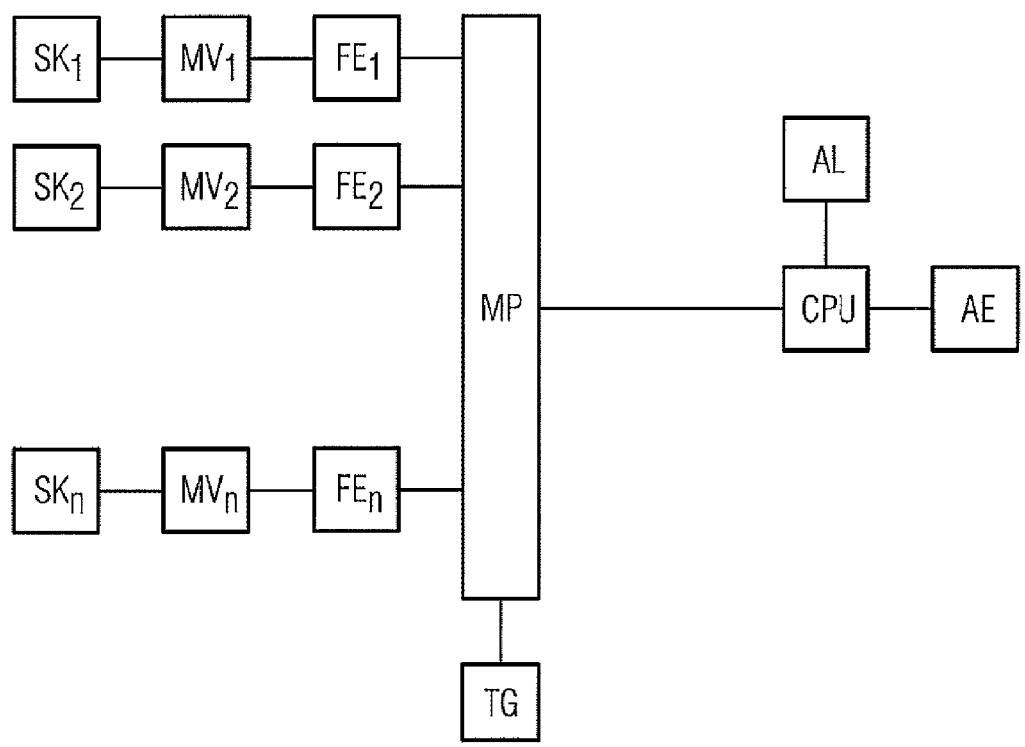
FIG. 3 shows a schematic block circuit diagram for central monitoring of a multiplicity of segments of contact line installations comprising supporting cables, contact wires and hangers and grounding lines, overhead lines and cable installations.

FIG. 3 shows a particularly inexpensive variant of the monitoring device according to the invention which can be expanded as desired. In this case, each loop circuit $SK_1$-$SK_n$ is provided with a measuring apparatus MV and a radio unit FE for transmitting the measurement signals from the measurement units MV. A central multiplexer MP, which is coupled to a computer CPU for processing the measurement signals, is provided for the reception of all measurement signals. The computer CPU is for its part connected to an alarm device AL and a display device AE for displaying the distance from the location of the fault.

In order now to ensure sensible processing and assignment of the transmitted measurement signals, the multiplexer MP is connected to a clock generator TG. This clock generator TG in the manner of a ring counter, allows successive enabling of the radio channels of the individual measuring apparatuses MV of the loop circuits $SK_1$-$SK_n$.

If the contact line and the supporting cable are now completely cut through, the current in the loop circuit $SK_1$-$SK_n$ will drop to 0 A, and the voltage drop across the measuring resistor $R_M$ will likewise drop to 0 V. If the voltage across the measuring resistor $R_M$ is monitored, it is possible for an alarm to be triggered in the event of a voltage drop to 0 V, or when the loop current is being monitored, in the event of a drop to 0 A.

It is not so easy to detect stealing of only the contact wire when the supporting cable remains undamaged. In this case, the loop current will drop since the contact line resistance $R_{FL}$ increases.

First, the current to be expected needs to be calculated.

The contact line has an equivalent cross section of, for example, 240 min$^2$ (supporting cable+contact wire+hanger). This results in a DC resistance $R_{20° C.}$ of 0.0782 Ω/km at 20° C. These are the known starting values.

The contact line resistance is, according to equation [1]:

$$R_{FL}=8\ km \times 0.0782 \Omega/km=0.6256 \Omega \quad [1]$$

The predetermined resistance of the measuring resistor is, according to equation [2]:

$$R_M=0.1\Omega \quad [2]$$

This gives a total resistance according to equation [3] of:

$$R_{ges}=R_{FL}+R_M=0.625\Omega+0.1\Omega=0.725\Omega \quad [3]$$

Using equation [3] it is now possible to determine the current flowing at a voltage of 5V VDC:

$$I=U/R=5V/0.7256\Omega=6.89A \quad [4]$$

Consequently, given this voltage, there is a voltage drop across $R_M$ of 0.689 V, in accordance with Ohm's law. If a ΔU of +−5 mV is now permitted, the voltage limits are 694 mV and 684 mV. The current flowing would in this case have values of 6.94 and 6.84 A, respectively.

If the equation [4] is converted to give the resistance, the following equation results:

$$R=U/I \quad [5]$$

The total resistance is thus:

$$R_{ges}=5V/6.84A=0.7310\Omega \quad [6]$$

Thus, after conversion of equation [3], the following results for the contact line resistance.

$$R_{FL}=R_{ges}R_M=0.7310\Omega-0.1\Omega=0.6310\Omega \quad [7]$$

Subtracting equation [1] from equation [7] gives a $\Delta_{RFL}$ of 5.4 mΩ.

The equivalent length of the contact line can now be calculated.

$$\Delta l = \Delta RFL/R20°\ C.=5.4\ m\Omega/78.2m\Omega/km=69\ m \quad [8]$$

This means that the contact line would theoretically need to be 69 m longer given a complete cross section. If it is now assumed that the cross section of the contact wire and the supporting cable is the same (supporting cable 120 mm$^2$ and contact wire 120 mm$^2$), the stolen contact wire length is twice as great. This means that, in order to trigger an alarm, 2×69 m=138 m of contact wire need to be cut away, leaving the supporting cable hanging.

As soon as the cross section of the supporting cable is smaller than that of the contact line, the contact wire section to be stolen is shortened correspondingly.

The invention claimed is:

1. A monitoring device for zero-voltage-switched contact line installations comprising supporting cables, contact wires and hangers as well as grounding lines, overhead lines and cable installations, wherein contact lines or overhead lines or cable installations are divided into segments of, in each case, two parallel strands, and a line resistance is formed by short-circuiting the strands of each segment at one end, free ends of the segments are connected to, in each case, one measuring resistor of a predetermined size and, in each case, one voltage source to form a respective closed circuit, and each circuit is connected to a measuring apparatus for measuring loop current, which measuring apparatus is equipped with a monitoring device for triggering an alarm of an alarm device in the event that a predetermined limit value is exceeded or the loop current is interrupted.

2. The monitoring device as claimed in claim 1, wherein the contact, overhead or cable installations are divided into segments.

3. The monitoring device as claimed in claim 1, wherein contact line installations are grouped into segments comprising contact wire sections and associated supporting cable sections.

4. The monitoring device as claimed in claim 1, wherein the segments are approximately 2-8 km long.

5. The monitoring device as claimed in claim 1, wherein each circuit is connected to a stabilized voltage source.

6. The monitoring device as claimed in claim 1, wherein circuits with respectively associated measuring apparatus are connected to a multiplexer, coupled to a central computer with an evaluation unit, and a clock generator is associated with the multiplexer for clocked connection of each measuring apparatus to the central computer.

7. The monitoring device as claimed in claim 1, wherein each circuits is connected to a respectively associated measuring apparatus directly or via a multiplexer via a radio link.

* * * * *